(12) United States Patent
Vecchietti et al.

(10) Patent No.: US 10,954,011 B2
(45) Date of Patent: Mar. 23, 2021

(54) DIAGNOSTIC METHOD FOR ANALYSING THE OPERATION OF AT LEAST PART OF A PRODUCTION LINE IN THE TOBACCO INDUSTRY

(71) Applicant: G.D S.P.A., Bologna (IT)

(72) Inventors: Luca Vecchietti, Monzuno (IT); Sergio Morelli, San Lazzaro di Savena (IT); Franco Spisni, Monghidoro (IT); Eugenio Navacchia, Bologna (IT); Maria Eleonora Cesarini, Anzola Dell-Emilia (IT); Gaetano De Pietra, Casalecchio di Reno (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 272 days.

(21) Appl. No.: 16/094,501

(22) PCT Filed: Apr. 19, 2017

(86) PCT No.: PCT/IB2017/052228
§ 371 (c)(1),
(2) Date: Oct. 18, 2018

(87) PCT Pub. No.: WO2017/182956
PCT Pub. Date: Oct. 26, 2017

(65) Prior Publication Data
US 2019/0118984 A1 Apr. 25, 2019

(30) Foreign Application Priority Data
Apr. 22, 2016 (IT) .................. 102016000042044

(51) Int. Cl.
*B65B 19/28* (2006.01)
*A24D 3/02* (2006.01)
(Continued)

(52) U.S. Cl.
CPC ............ *B65B 19/28* (2013.01); *A24C 5/00* (2013.01); *A24C 5/34* (2013.01); *A24D 3/02* (2013.01);
(Continued)

(58) Field of Classification Search
USPC .......................................... 700/108
See application file for complete search history.

(56) References Cited

U.S. PATENT DOCUMENTS 3,729,636 A 4/1973 Merker
4,877,040 A 10/1989 Jansma et al.
(Continued)

FOREIGN PATENT DOCUMENTS

CN 104049585 A 9/2014
CN 104270830 A 1/2015
(Continued)

OTHER PUBLICATIONS

International Search Report and Written Opinion dated Jun. 27, 2017 for counterpart PCT Application No. PCT/IB2017/052228.
(Continued)

*Primary Examiner* — Robert A Cassity
(74) *Attorney, Agent, or Firm* — Shuttleworth & Ingersoll, PLC; Timothy Klima

(57) ABSTRACT

A diagnostic method for analysing the operation of at least part of a production line in the tobacco industry includes feeding through the line a probe having the shape of a smokers' article and provided with an electronic card configured to acquire one or more parameters; the method includes a step of activating the probe with the possibility of temporally synchronizing the data acquired by the probe with the data acquired by the line at the same time.

27 Claims, 4 Drawing Sheets

(51) Int. Cl.
    *B65B 19/02*       (2006.01)
    *A24C 5/00*        (2020.01)
    *G07C 3/00*       (2006.01)
    *A24C 5/34*       (2006.01)
    *G05B 19/418*    (2006.01)
    *G07C 3/08*       (2006.01)
    *B65B 57/00*     (2006.01)

(52) U.S. Cl.
    CPC ........ B65B 19/02 (2013.01); G05B 19/41875 (2013.01); G07C 3/00 (2013.01); G07C 3/08 (2013.01); B65B 57/00 (2013.01)

(56) References Cited

U.S. PATENT DOCUMENTS

2004/0102864 A1\*   5/2004   Stack .................... A24C 5/345
                                                                                   700/110
2005/0005580 A1    1/2005   Spatafora et al.
2006/0116782 A1\*   6/2006   Li Vigni ................ B65B 19/32
                                                                                    700/96
2016/0004956 A1\*   1/2016   Reynolds ................ A61L 2/07
                                                                                    377/15

FOREIGN PATENT DOCUMENTS

| | | | |
|---|---|---|---|
| CN | 104620183 A | 5/2015 | |
| CN | 105518552 A | 4/2016 | |
| EP | 1267231 A2 | 12/2002 | |
| EP | 2159176 A1 \* | 3/2010 | ............. A24C 5/323 |
| EP | 2522237 A1 | 11/2012 | |
| WO | WO2014170829 A | 10/2014 | |

OTHER PUBLICATIONS

Chinese Office Action dated Sep. 3, 2020 from counterpart Chinese Patent Application No. 201780024959.0.

\* cited by examiner

DIAGNOSTIC METHOD FOR ANALYSING THE OPERATION OF AT LEAST PART OF A PRODUCTION LINE IN THE TOBACCO INDUSTRY

This application is the National Phase of International Application PCT/IB207/052228 filed Apr. 19, 2017, which designated the U.S.

This application claims priority to Italian Patent Application No. 102016000042044 filed Apr. 22, 2016, which application is incorporated by reference herein.

TECHNICAL FIELD

This invention relates to a diagnostic method for analysing the operation of at least part of a production line in the tobacco industry.

More in general, the invention relates to a method, a line and a probe allowing monitoring and diagnosis of the performance and state of machines used for the production and packing of smokers' articles, that is, articles processed in the tobacco industry.

BACKGROUND ART

As is known, a need which is felt particularly strongly in the tobacco industry (that is, in the cigarette production and/or packing sector) is that of monitoring—for essentially diagnostic purposes—the performance and state of the machines forming part of the cigarette production and/or packing line.

Obviously, a need which is felt particularly strongly is that of being able to monitor the state of machine components in order to avoid visual inspections by operators which inevitably entail removing certain components and cause lengthy machine downtimes.

Another need which is felt particularly strongly by machine designers and installers is that of being able to diagnose machine operation upon completion of assembly and/or installation in order to ensure that the machine is properly operational prior to delivery to the end customer.

DISCLOSURE OF THE INVENTION

This invention has for an aim to provide a diagnostic method for analysing the operation of at least part of a production line in the tobacco industry to overcome the above mentioned drawbacks of the prior art.

More specifically, the aim of the invention is to provide a diagnostic method for analysing the operation of at least part of a production line in the tobacco industry and which is particularly effective.

These aims are fully achieved by the method forming the object of this invention and as characterized in the appended claims.

Thus, this description provides a diagnostic method for analysing the operation of at least part of a production line in the tobacco industry. The method involves using at least one probe (one or more probes) made in the shape of a smokers' article.

The expression "production line in the tobacco industry" is used to mean a machine, or a plurality of machines interconnected in any way, designed to make smokers' articles.

The expression "smokers' article" is used to mean cigarettes (or cigars) or parts of cigarettes (for example, cigarette filters), or cigarette packages, such as packets or cartons of packets, or parts of packets (for example, spacers for keeping groups of cigarettes inside a packet separate).

Thus, the probe is made in the shape of one of the following smokers' articles: cigarette filter; cigarette; cigarette spacer (used to keep groups of cigarettes inside the packet spaced apart); cigarette packet; carton of cigarette packets.

The line includes at least one operating unit (also called "machine" in this description).

Each machine is configured to continuously process a succession of smokers' articles.

In an example embodiment, the line comprises one or more of the following operating units: filter making machine; cigarette making machine; machine for attaching filters to cigarettes; cigarette reservoir; packing machine; wrapping machine (overwrapper); cartoning machine; box packing machine.

In other embodiments, the line might comprise any subset of the units listed above; in one example, the line might comprise just one operating unit.

In one embodiment, the line comprises one or more of the following machines: cigarette making machine, machine for attaching filters to cigarettes, packing machine, wrapping machine (overwrapper), cartoning machine.

The line has (at least) one control unit. The control unit is configured to control the operation of at least part of the line.

It should be noted that the control system of the line (or even of a single machine) may have centralized or distributed logic. Thus, in one example, there might be a single control unit configured to control an entire machine or the entire line; the controller might, however, include a plurality of interconnected, hierarchically-structured controllers (or control units).

The line includes one or more line sensors. The line sensors are configured to measure respective machine parameters, representing the operation of at least one element of the line. For example, the machine parameters represent a position of respective movable elements forming part of the line (that is, of a machine of the line). For example, the machine parameters may consist of angles or relative or absolute positions. The line sensors may consist, for example, of encoders or pulse counters or position signals provided by corresponding actuators (to name but a few).

In an example embodiment, one or more line sensors are dedicated to measuring a phase parameter (for example, position, speed or acceleration) representing the movement of one or more conveyors used to move the smokers' articles along the line (in particular, within the machines of the line).

The phase parameter makes it possible to track the movement of a point of the conveyor (or of a smokers' article coupled therewith) along the movement path in a given time (that is, as a function of an operating time interval of the machine or of the line).

In an embodiment, one or more line sensors are dedicated to measuring parameters such as temperature, pressure or applied force, associated with one or more of the machine (or line) elements.

The control unit is connected to (that is, is in communication with) the at least one line sensor. The control unit is programmed to control (drive) the acquisition of machine parameters by the line sensors.

The set of values adopted by the machine parameters in a machine or in the line at a given instant represents the operating state (or configuration) of the machine or line, respectively.

The probe comprises at least one local sensor configured to measure at least one probe parameter. Preferably, the probe comprises a plurality of local sensors.

For example, the probe comprises one or more local sensors selected from the following list: a gyroscope; an accelerometer; a force sensor (for example, a load cell); a thermometer; a magnetometer; an optical sensor; an acoustic sensor.

The function of the gyroscope is to measure the position of the probe in three-dimensional space relative to the three Cartesian axes and to detect rotational movements of the probe.

The function of the accelerometer is to measure the changes in probe speed as it moves within the line, in order to derive information representing the impacts which the probe undergoes.

The force sensor is preferably a pressure sensor; its function is to measure the strain applied to the probe (for example, in passing between wheels or in the conveyor belts). In an example embodiment, the probe comprises a plurality of force sensors. For example, if the probe has the shape of a packet (that is, a parallelepiped having faces and edges) it is provided with several force sensors located on the faces and/or on the edges; for example, one for each face and/or one for each edge.

The function of the thermometer is to measure the temperature of the probe or of the atmosphere surrounding the probe (this is particularly useful when the probe stops in proximity to heating units or a drying bar).

The function of the magnetometer is to measure the magnetic field intensity in the atmosphere surrounding the probe.

The function of the optical sensor is to measure the intensity of light in the atmosphere surrounding the probe, or the intensity of the irradiation received by the probe.

The function of the acoustic sensor is to measure the intensity of noise in the atmosphere surrounding the probe.

In a possible example embodiment, the probe comprises a plurality of local sensors, where the plurality includes a gyroscope and/or an accelerometer.

The probe also comprises a processor. In one example, the processor is provided with a clock (oscillator).

The probe also comprises a memory to store data ("on board" the probe).

The probe also comprises a data transmission module. Preferably, the data transmission module is configured to transmit input and output data. Preferably, the data transmission module is configured to transmit data with a signal (preferably a radio signal) in a wireless network.

The probe also comprises an electric power supply (of its own). For example, the electric power supply of the probe is a rechargeable battery.

The probe may comprise one or more of the following elements: an ON/OFF button, a reset button, an light (LED) indicator and an image capturing device. Le light indicator (e.g. LED) is configure for emitting an optical signal, which can be detected by line sensors, as the probe moves through the line (machine), because it is processed by the line (machine) as if it was a corresponding article (cigarette package, cigarette, ecc.).

In one embodiment, the electronic card (the processor) of the probe is configured for processing the probe data detected (acquired) by the selfsame probe. Such a processing can be carried out in real time, or substantially in real time (that is, without the need to permanent storage of the acquired data in a memory).

The electronic card (the processor) of the probe is configured for processing the probe data detected (acquired) by the selfsame probe, to provide, at output of the probe, (treated) probe data which are particularly easy to be transmitted to the control unit or to other processing units.

Hence, sais processing, which is carried out locally at the probe, constitutes a pre-processing; the probe data provided as outcome of said pre-processing can be later subject to a post processing step.

In at least one embodiment, the probe is shaped as a cigarettes' package; such a package has the shape of a parallelepiped; that is, the package has four couples of opposite (outer) walls, defining a outer surface of the selfsame package. The probe has a core arranged in an internal volume surrounded by the outer walls; the outer walls are connected to the core. The core may include the electronic card.

In one embodiment, one or more (preferably all of them) of the outer walls of the probe are movable (or deformable); preferably, they are movable (deformable) by translation along directions which are orthogonal to the respective walls couples. In one embodiment, one or more (preferably all of them) of the outer walls are movably connected to the core; preferably, they are movably connected to the core through elastic (resilient) elements, such as springs, for example.

In one embodiment, the probe includes sensors for detecting the displacement of the walls; for example, these sensors are configured for detecting a movement of the walls relative to the core (approaching or away from the core). This allows to determine a quantity (for example a distance or an electrical quantity), which provides a parameter representative to the force or pressure applied to the package, in an indirect way, which is particularly simple and reliable.

In one embodiment, the probe includes, for each outer wall, a plurality of sensor responsive to the position of the wall; for example, three or more sensors for each wall, which are not aligned with each other. This allows to determine a squaring of the outer walls of the probe (i.e. to determine whether the shape of the probe is actually a parallelepiped).

In one embodiment, said sensors are sensitive to the capacity (measured in Farad) between the outer walls and the core. In one embodiment, the probe is configured to establish a reference electrical field, to allow detection of said capacity (or inductance), forming an electrical parameter representative of the strain applied to the probe.

In an example embodiment according to this description, the probe also includes a recognition element. The recognition element may, for example, be an RFID device or a magnetic element or an optical identifier.

The recognition element is configured to interact (preferably contactlessly; preferably also without optical contact) with a suitable detector included in the line.

The detector may be, for example, an RFID reader or a magnetic element or other presence or proximity sensor (or even a camera).

In an example embodiment according to this description, the detector is located along a feed path of the smokers' articles moving along the line. In an example embodiment, the detector is configured to detect the presence of the probe on the feed path in response to an interaction with the recognition element of the probe.

As is known, packing machines and overwrappers comprise a product feed hopper.

In another example embodiment, the recognition element (preferably a magnet) is located in the hopper (of a packing machine or overwrapper).

The probe is preferably provided with a magnetic field detector (magnetometer).

When the probe passes in front of the recognition element (magnet) in the hopper, the probe detects the magnetic field and sends a synchronization request message to an external electronic device (for example, to the tablet or to the HMI).

The probe receives an activation (START) signal (a message which may include a time signal) transmitted by the external device.

According to one aspect, the probe starts polling (circular scanning) the values of the parameters/quantities provided by the sensors on board the probe itself.

For example, the probe stores the polled values in the micro SD memory, associating them with a time stamp or a progressive frequency counter.

Alternatively, the probe transmits the polled data to the external device in real time, as soon as they are acquired, via radio (WiFi, Bluetooth).

The probe travels through the entire line or the individual machine and is expelled at the outfeed end (where there is preferably an expulsion or rejection pusher).

At the outfeed end, the controller or control unit preferably counts the steps and expels the probe in programmed manner.

At the outfeed end, there is preferably also a recognition element (for example, a magnet). According to this aspect, the probe detects the presence of the recognition element ad sends an expulsion request to the control unit.

Alternatively, the control unit detects the passing of the probe provided with a recognition element at a predetermined position in the proximity of the machine/line outfeed and activates the expulsion pusher.

Preferably, the external device (for example, tablet or HMI) sends an acquisition end (STOP/END) signal to the probe.

In un example embodiment, the probe might comprise an interface module (for example a Bluetooth connection); for example, the interface module is additional to the data transmission module.

In un example embodiment, the probe might comprise a serial port (for example a USB).

In un example embodiment, the probe might comprise the aforementioned recognition element.

It should be noted that, in one example, the probe comprises an electronic card, which includes (or is connected to) one or more of the electronic components mentioned above as included in the probe.

It should be noted that the probe may comprise an on/off button.

In an example embodiment, according to this description, the method comprises a step of generating an activation signal.

The activation signal is used to start the process of diagnosing or testing the operation of the machine (or line) correlated with the transit of the probe in the machine (or line).

During the diagnostic or test process, the probe acquires a set of probe data by way of the at least one local sensor. The at least one local sensor is configured to acquire at least one probe parameter. Thus, the probe data includes values representing at least one probe parameter.

The probe acquires the probe data in response to receiving the activation signal.

In one example, the activation signal (that is, the receiving thereof by the probe) defines the starting time of the test process. In one example, the starting time is the instant the probe starts acquiring the probe data. For example, the probe data set is acquired in the time between the start instant and an acquisition stop instant.

In an example embodiment, during the diagnostic or test process, the line control unit acquires a set of line data by way of the at least one line sensor. The at least one line sensor is configured to measure at least one machine parameter representing the operation of at least one element of the line; thus, the line data include values representing at least one machine parameter.

The control unit acquires the line data in response to receiving the activation signal.

In one example, the activation signal (that is, the receiving thereof by the control unit) defines the starting time for acquiring the line data. For example, the line data set is acquired in the time between the acquisition start instant and the acquisition stop instant. It should be noted that the activation signal might simply comprise a pulse or it might be a digital signal; the activation signal might comprise several items of information; for instance, a time indication (a date for example).

The data of the probe data set are stored in whole or in part (at least temporarily) in the probe memory.

The data of the line data set are stored in whole or in part (at least temporarily) in a memory of the controller.

The data of the probe data set might also be stored (transferred) into an electronic database (different from the probe memory).

In one example, the electronic database might be formed by the (at least one) memory of the line controller.

In one example, the electronic database might be formed by the memory of a portable electronic appliance (for example, a tablet or a smartphone or a portable PC).

The activation signal is generated by a computer.

The computer transmits the activation signal to the probe. In an example embodiment, the computer transmits the activation signal to the controller. Preferably, the computer transmits the activation signal to the probe and to the controller simultaneously (defining a single starting instant).

In one example, the computer may be included in the controller of the line. In one example, the computer may be included in the portable electronic appliance.

For example, the activation signal may be generated in response to a command issued by a user through an interface.

In one example, the computer might be programmed to generate the start signal automatically, for example in response to detection of the probe by a detector included in the line. In such a case, the machine automatically senses when the probe enters or exits (the feed path in the machine) and thus automatically generates the start signal as a function of the interaction of a recognition element of the probe with a (stationary) detector of the machine.

The method of this description also comprises temporally correlating the data acquired from the probe with (all or part of the) data acquired from the line.

For example, the data stored in the electronic database might be (temporally) correlated. In an example embodiment, this correlation is performed by the computer.

In an example embodiment, the (electronic card of the) probe comprises a synchronizer. The synchronizer is configured to generate a synchronization signal. Preferably, the synchronization signal refers to the starting instant.

The processor of the probe is programmed to associate with each data item acquired a corresponding value of the synchronization signal.

For example, the synchronization signal is a signal of a counter (this allows simplifying the electronics of the probe) or a signal of a timer or other periodic signal with known period.

In an example embodiment, the controller of the line comprises a clock (or other synchronizing device) and is programmed to associate with each data item it acquires a reference instant. Preferably the reference instant is referred to the starting instant.

In one example, the computer is programmed to set in relation to each other the values of the synchronization parameter (associated with the probe data) and corresponding reference instants associated with the line data).

In one example, (temporally) correlating comprises, for each item of the probe data set, setting in relation to each other a synchronization parameter value (referred to the starting instant and) assigned to that data item, and a corresponding reference instant assigned to at least one respective item of the line data set.

Synchronizing the data allows setting in relation with each other the parameters measured by the probe at the different acquisition instants and the corresponding positions of the probe along the probe feed path, and/or corresponding machine parameters. This allows performing a particularly reliable and accurate analysis of machine operation.

In an example embodiment, the controller of the line and the processor of the probe are configured to acquire the respective data at the same sampling frequency. In one example, the step of the probe counter is equal to (a multiple or submultiple of) a period of the clock of the controller.

Also, the synchronizer on board the probe is a slave clock serving the (master) clock of the line controller.

It should be noted that this description provides a (diagnostic) probe for analysing the operation of at least part of a production line in the tobacco industry; wherein the probe has one or more of the features set out in this description.

It should be noted that this description also provides a computer program comprising a software for performing the steps of the method according to one or more of the aspects set out in this description.

In an example embodiment, the computer program is an application which can be loaded and run in a portable electronic appliance (such as a tablet or a smartphone, for example).

Thus, it should be noted that the method according to this description comprises introducing the probe into the line at an infeed position.

Further, the method comprises the step of activating the probe (through the wireless start signal) and the step of acquiring the probe data from the probe as it moves through the at least part of the line.

In one example, the step of introducing the probe into the line can be carried out manually by a user, with the machine stationary. In this case, the infeed position might also be any intermediate point along the feed path of the smokers' articles within a machine.

In another example, the probe is introduced into the line automatically since the probe is loaded into the line during normal machine operation in the same way as a smokers' article which has the same shape as the probe. In this case, the infeed position might be, for example, a feed hopper containing cigarettes or filters or packets or spacers or cartons. In this case, the activation signal is preferably generated automatically by the line as a function of recognizing entry of the probe (which is then distinguished from the actual smokers' articles) into the feed path of the smokers' articles within a machine (according to one or more of the modes described above).

According to one aspect of the present disclosure, the data acquired by the probe (and, in at least one embodiment, by the line sensors) are processed, to identify (to enable users to correct) anomalies in said at least part of a production line.

In an embodiment, such a processing can be carried out by the control unit of the line, or by another computing unit within the line.

In one embodiment, such a processing can be carried out by a computing unit located remotely with respect to the line. In one embodiment the control unit of the line has access to the remote computing unit, for example through internet connection or through other communication systems.

In one embodiment, such a processing can be carried out by said external electronic device.

In one embodiment, such a processing can be carried out by the processor of the probe.

Indeed, one or more of the control unit of the line, the (remote) computing unit, the external electronic device or the probe are configured for processing the data acquired by the probe (and/or, in at least one embodiment, by the line sensors).

The diagnostic method of the present disclosure has a plurality of possible applications.

One possible application is to verify the specifications of the project are met, in terms of the design of the cigarettes package and of the interaction between the cigarettes package and the machine (line) where the package is processed in use. This may occur during the step of developing or testing the machine (line) that has to be manufactured.

Another possible application is to check the performance of the machine (line) which has been manufactured, either before delivering it to the customer, or after the installation of the machine (line) at the customer's premises. This check is meant to be carried out by the manufacturer (supplier) of the machine (line).

Another possible application is to allow the user of the machine (line) to check its performance or correct operation, at any time after installation. This check is meant to be carried out by the user of the machine (line), possibly with the purpose to monitor the performance of the machine (or line), along with its use.

BRIEF DESCRIPTION OF THE DRAWINGS

This and other features of the invention, together with its advantages, will become more apparent from the following description of a preferred embodiment of it, illustrated by way of non-limiting example in the accompanying drawings, in which.

DETAILED DESCRIPTION OF PREFERRED EMBODIMENTS OF THE INVENTION

Figure 1:
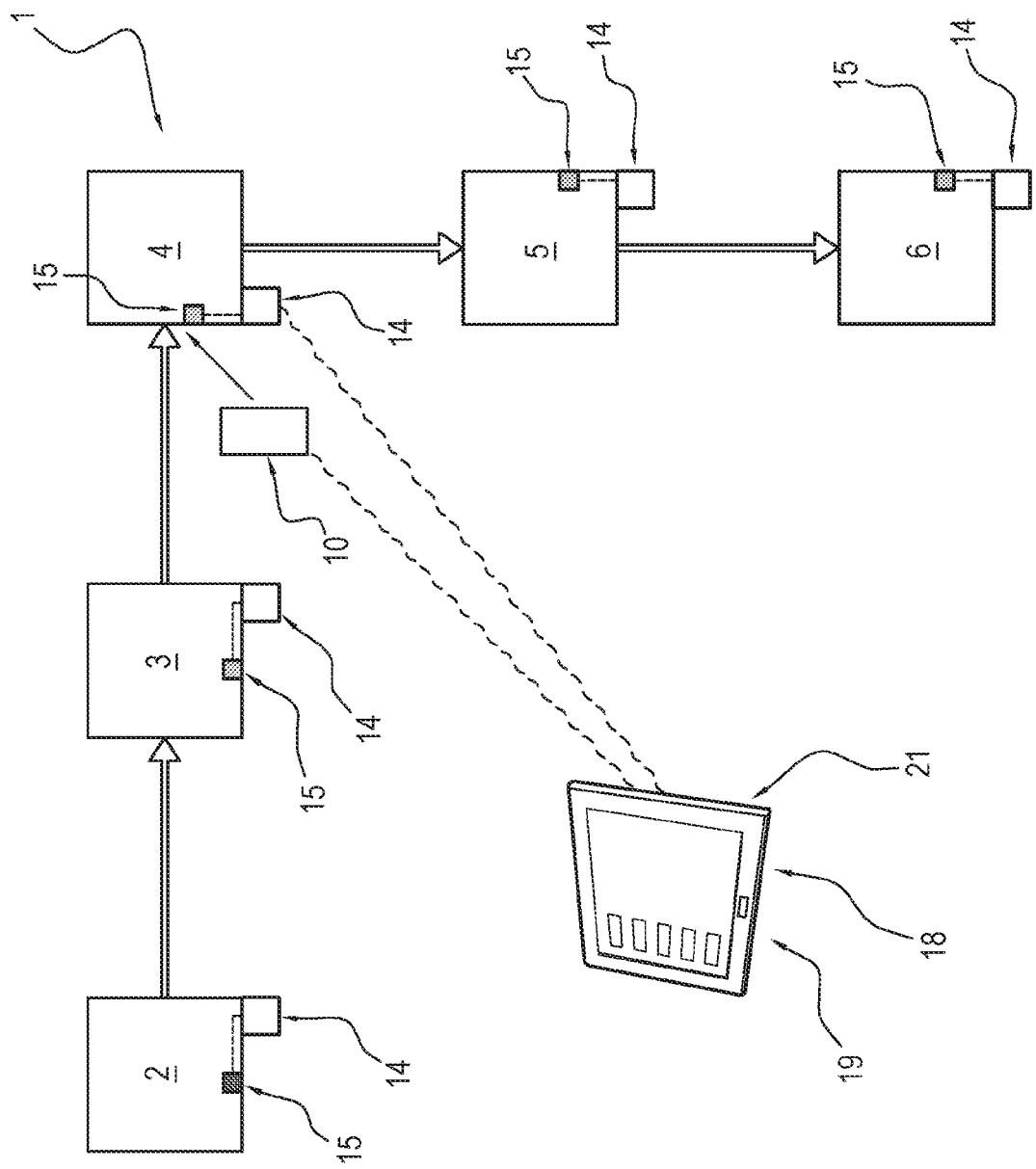
FIG. 1 is a schematic view of a production line of the tobacco industry according to this description.
Figure 2:
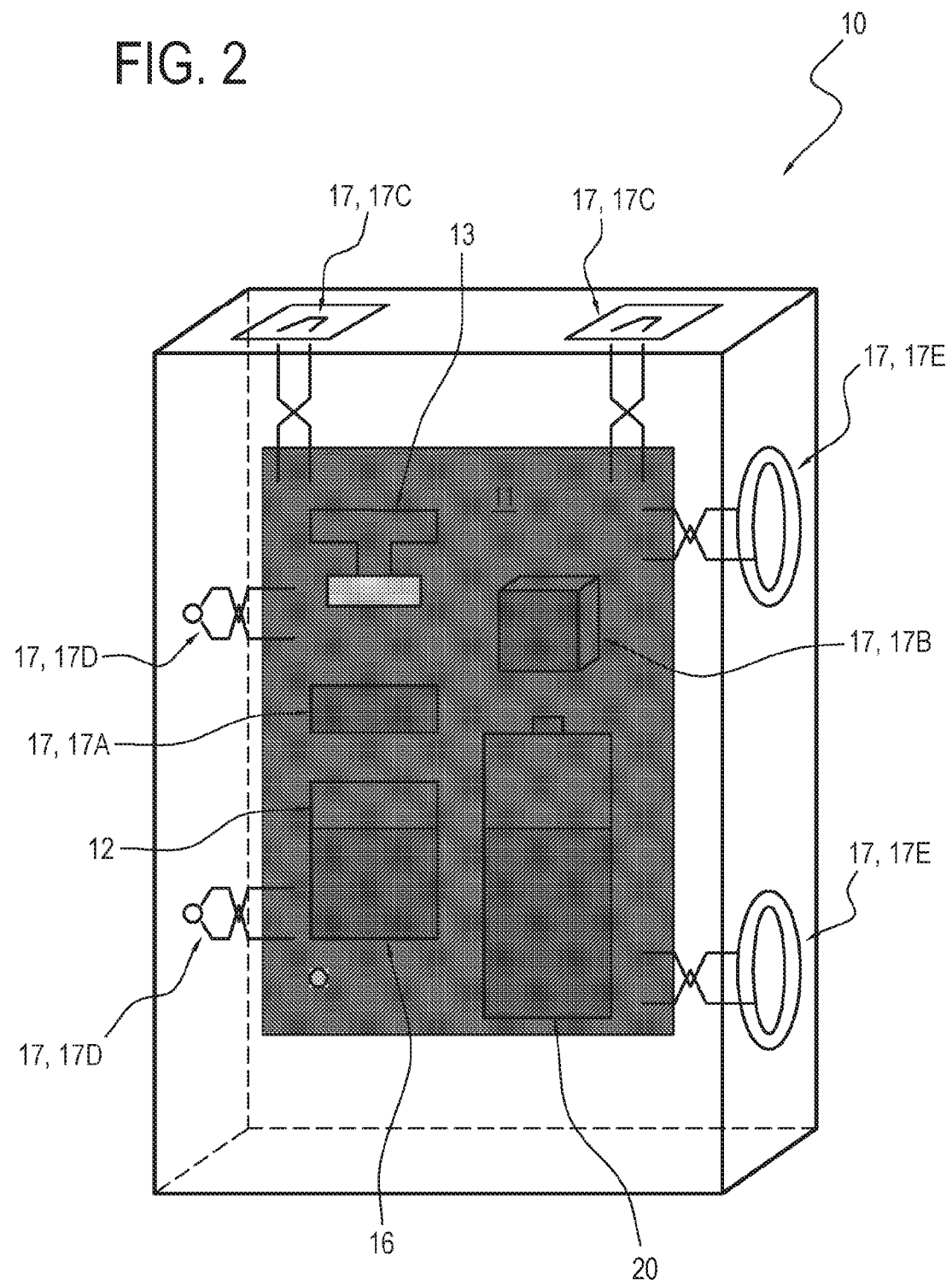
FIG. 2 schematically illustrates an example embodiment of a diagnostic probe according to this description.
Figure 3:
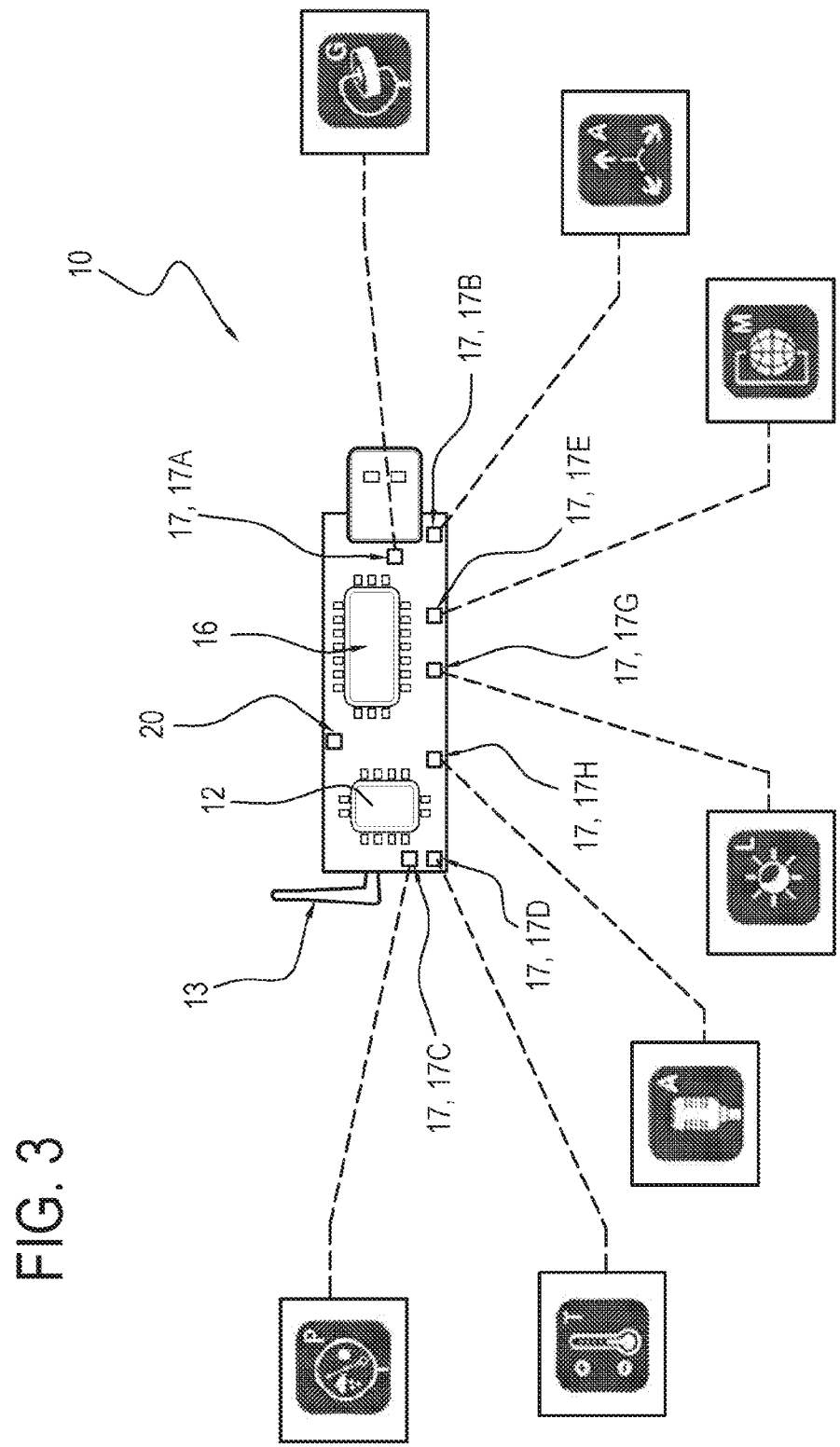
FIG. 3 schematically illustrates the probe of the preceding figure
Figure 4:
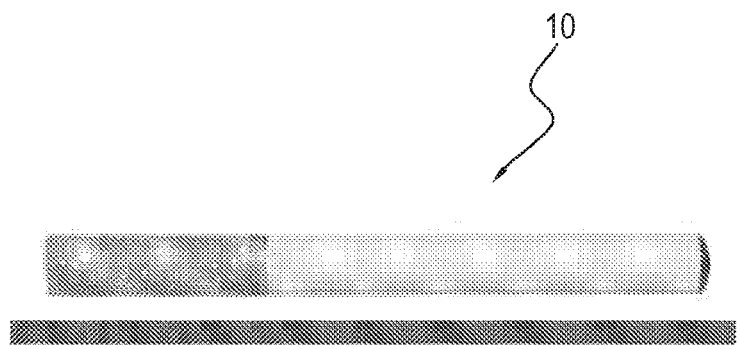
FIGS. 4 and 5 schematically illustrate respective example embodiments of a diagnostic probe according to this description.
Figure 5:
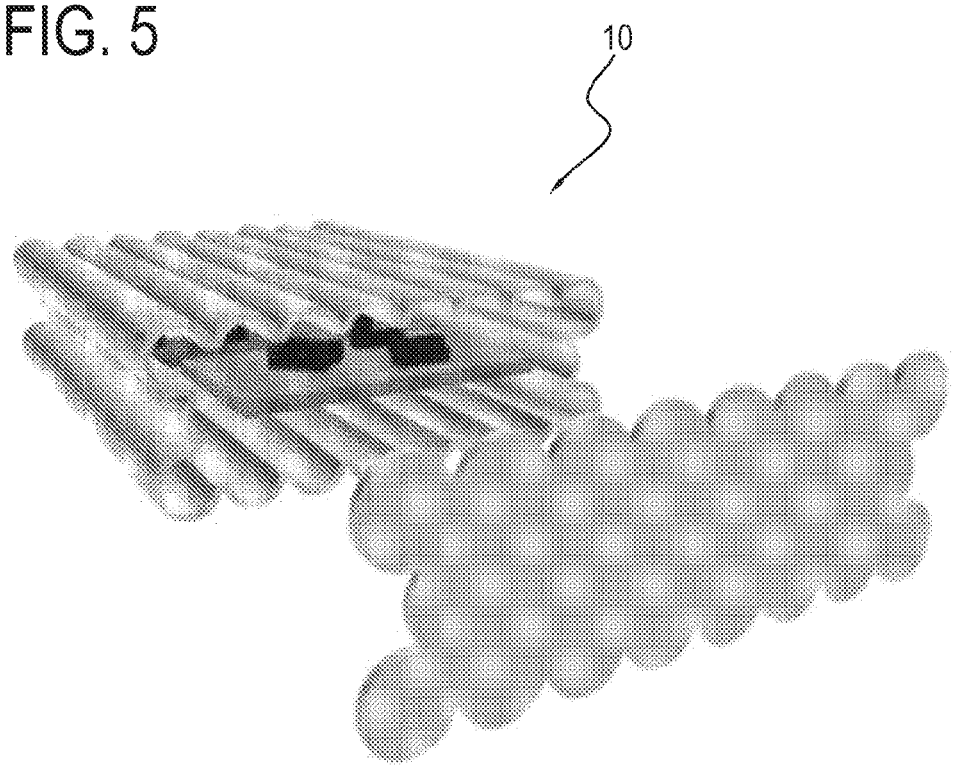

The reference numeral 1 denotes a generic line for the production of articles of the tobacco sector (in particular, for making cigarettes), hereinafter also referred to as products of the tobacco industry.

The line 1 may comprise one or more of the following machines, described below.

A first type of machine is what is known as a "cigarette maker" designed to make a cigarette rod containing tobacco (without filter).

In FIG. 1, the cigarette maker is denoted by the reference numeral 2.

The cigarette maker 2 allows wrapping a predetermined quantity of tobacco in a sheet of paper to make a plurality of rods of tobacco wrapped in paper of predetermined size and length which will subsequently constitute cigarettes.

The cigarette maker 2 is well described in patent document EP2522237B1 which is in the name of the same Applicant as this invention and whose content (with particular regard to structure, functions and operating modes of the component parts of the machine) is fully incorporated herein by reference.

A second type of machine is what is known as "filter tip attachment" machine designed to make a cigarette.

In FIG. 1, the filter tip attachment machine is denoted by the reference numeral 3.

The filter tip attachment machine 3 allows attaching one or more rods of filter material, that is, filters, to an element of predetermined size and length previously made by the maker 2 in order to make a finished cigarette.

The filter tip attachment machine 3 is well described in patent document EP1791146B1 which is in the name of the same Applicant as this invention and whose content (with particular regard to structure, functions and operating modes of the component parts of the machine) is fully incorporated herein by reference.

A third type of machine is what is known as a "packing machine" designed to make a packet of cigarettes (containing a predetermined number of cigarettes).

In FIG. 1, the packing machine is denoted by the reference numeral 4.

The packing machine 4 allows inserting the cigarettes into packets which are formed by the machine itself.

The packing machine 4 is well described in patent document EP1267231A1 which is in the name of the same Applicant as this invention and whose content (with particular regard to structure, functions and operating modes of the component parts of the machine) is fully incorporated herein by reference.

A fourth type of machine is what is known as an "overwrapping machine" designed to overwrap a packet of cigarettes (containing a predetermined number of cigarettes).

In FIG. 1, the overwrapping machine is denoted by the reference numeral 5.

More precisely, therefore, the overwrapping machine 5 allows the full packets of cigarettes to be wrapped in cellophane.

The overwrapping machine 5 is well described in patent document EP1640268B1 which is in the name of the same Applicant as this invention and whose content (with particular regard to structure, functions and operating modes of the component parts of the machine) is fully incorporated herein by reference.

A fifth type of machine is what is known as "cartoning machine" designed to allow making a carton of cigarette packets (from cigarette packets fed into it).

In FIG. 1, the cartoning machine is denoted by the reference numeral 6.

The cartoning machine 6 is well described in patent document US2005/0005580A1 (or in the corresponding priority document BO2003A000317) which is in the name of the same Applicant as this invention and whose content (with particular regard to structure, functions and operating modes of the component parts of the machine) is fully incorporated herein by reference.

The line 1 also preferably comprises a controller 14 (hereinafter also referred to as control unit 14) configured to control all or part of the machine (2, 3, 4, 5, 6) making up the line.

It should be noted that the controller 14 may be a single controller or it may be a distributed control unit (that is, one consisting of two or more modules distributed along the line 1, each dedicated to a specific function).

According to one aspect of it, this description defines a diagnostic method for analysing the operation of at least part of a production line 1 for making smokers' articles, that is to say, one or more machines (2, 3, 4, 5, 6) making up the line 1 itself.

The method is implemented by a probe 10 (described in more detail below), which is made in the shape of a smokers' article and which is provided with a processor 16, at least one local sensor 17, a memory 12, a data transmission module 13 and an electrical power supply 20.

This diagnostic method comprises the following steps:
generating an activation signal;
transmitting the activation signal to the processor of the probe 10 at a starting (or activation) instant;
transmitting the activation signal to the processor control unit 14 of the line 1 at the starting instant;
receiving in an electronic database 21 a set of data of the probe 10 acquired from the probe 10 (at successive time instants), in response to the activation signal received, between the starting instant and an end of acquisition instant;
receiving in the electronic database 21 a set of line data acquired by the control unit 14, in response to the activation signal received, between the starting instant and the end of acquisition instant;
temporally correlating the data sets of the probe and of the line.

It should be noted that the activation signal may be generated by an electronic appliance 19 outside of the control unit 14 and probe 10.

Alternatively, the activation signal may be generated by the control unit 14 of the line; in particular by a (software or hardware) module of the control unit 14 of the line 1.

Preferably, in the latter case, the control unit 14 of the line 1 comprises a dedicated (software or hardware) module for generating an activation signal and a dedicated module for acquiring the line data.

It should be noted that according to this aspect, the line 1 may comprise a sensor for detecting the presence of the probe 10 and the module for generating the activation signal may be configured to generate the activation signal as a result of a signal from the sensor that detects the presence of the probe 10 in the line 1.

That way, the activation signal is advantageously emitted fully automatically by the line 1 itself.

It should be noted that according to another aspect, the stop signal (to end acquisition) might also be emitted fully automatically by the line 1 when the aforementioned sensor detects the passage of the probe 10 at a predetermined point of the line (for example, at the outfeed end of the machine).

It should be noted that the line data comprises a data set representing at least one machine parameter—for example, the operating state of one or more machines (2, 3, 4, 5, 6) of the line 1—as explained in more detail below.

According to another aspect, the method further comprises a step of transmitting a stop signal to the processor of the probe 10 and to the control unit of the line 1 at the end of acquisition instant.

The step of transmitting the stop signal causes the probe 10 and the control unit 14 to end acquisition of probe data and line data, respectively.

It should be noted that the step of generating an activation signal is preferably carried out by an electronic appliance 19 different from, and outside of, the probe 10 and the control unit 14 of the line 1.

In other words, the electronic appliance 19 (preferably in response to a command from the operator) generates the start signal and transmits it to the probe 10 and to the control unit 14 of the line 1.

It should be noted that the step of generating a stop signal is preferably carried out by the aforementioned electronic appliance 19 different from, and outside of, the probe 10 and the control unit 14 of the line 1.

It should be noted that the electronic appliance 19 preferably comprises the electronic database 21 and a computer 18 (electronic).

Preferably, the electronic appliance 19 is a portable electronic appliance.

More preferably, the electronic appliance 19 is one of the following: a tablet, a personal digital assistant, a smartphone, a PC.

Alternatively, the electronic appliance 19 may be an HMI (Human Machine Interface) integrated in the line/machine.

It should be noted that the electronic appliance 19 preferably comprises a (hardware and/or software) module for communication with the probe 10 and a (hardware and/or software) module for communication with the control unit 14.

The electronic appliance 19 preferably also comprises a data analysis module configured to statistically analyse the line data and the probe data which have been temporally correlated with each other beforehand.

It should be noted that, more generally speaking, that the electronic appliance 19 is an appliance provided with a user interface (enabling a user to issue commands, in particular the acquisition start and/or the acquisition stop command).

Preferably, the electronic appliance 19 is provided with a memory.

The electronic appliance 19 is preferably also provided with a display unit.

It should be noted that the electronic appliance 19 allows analysing the line data and the probe data after they have been suitably correlated temporally.

More specifically, the data can be displayed in table form and reports can be generated.

It should be noted that, the step of receiving in an electronic database 21 a set of probe data acquired from the probe 10, in response to receiving an activation signal between the starting instant and an end of acquisition instant preferably comprises the step of transmitting the probe data set from the probe 10 to the electronic appliance 19.

It should be noted that, the step of receiving in an electronic database a set of line data acquired from the control unit 14, in response to receiving an activation signal between the starting instant and the end of acquisition instant preferably comprises the step of transmitting the line data set from the control unit of the line 1 to the electronic appliance 19.

It should also be noted that the step of temporally correlating the data sets of the probe and of the line is preferably carried out by the processor 18 of the electronic appliance 19.

Preferably, the temporal correlation step comprises, for each item of the probe data set, setting in relation to each other a synchronization parameter value referred to the starting instant and assigned to that data item, and a corresponding reference instant assigned to at least one respective item of the line data set.

It should be noted that the invention also defines a program (computer software) configured to implement the steps of the method according to this description.

It should be noted that the computer program is configured to be installed in the electronic appliance 19 (more precisely, in the computer 18).

According to another aspect, the method comprises, after the step of transmitting the activation signal to the processor of the probe 10 at a starting (or activation) instant, the step of acquiring (preferably at a predetermined sampling interval) the values of parameters measured by the at least one sensor 17 of the probe 10.

According to another aspect, the method comprises, after the step of transmitting the activation signal to the control unit 14 at the starting instant, the step of acquiring (preferably at a predetermined sampling interval) the values of parameters representing the state of the line 1 and defining the aforementioned line data.

According to one aspect, the control unit 14 of the line 1 and the processor 16 of the probe 10 are configured to acquire the respective data at the same sampling frequency.

Advantageously, that way, the probe 10 and the control unit 14 acquire the same number of samples in a predetermined time interval: in other words, the n-th sample acquired by the probe 10 and the m-th sample acquired by the control unit 14 are acquired at the same time instant.

Obviously, this facilitates the subsequent analysis of the values of the parameters acquired by the probe 10 and by the control unit 14.

It should be noted that the parameters of the line 1 may be parameters representing physical quantities associated with the parts or components of one or more machines 1, such as, for example, positions, phases, speeds, pressures, rotation angles of encoders or resolvers, position angles of components.

Preferably, the parameters of the line 1 correspond to signals provided by sensors 15 or actuators present in the line 1.

It should be noted that according to another aspect, the line parameters may comprise a phase parameter representing a position occupied at a given instant by one or more conveyor units configured to move the smokers' articles along at least part of the line 1.

It is thus advantageously possible to know the position of the probe 10 along the path of the line 1 at any sampling instant.

In effect, in order to better clarify this aspect, the fact the line parameters comprise a phase parameter representing a position occupied at a given instant by a conveyor unit means that the position of the probe 10 (which is moved by, or as one with, the conveyor unit) can be traced with a high degree of precision and accuracy by analysing the signal over time.

For example, if the line parameters comprise the speed of a conveyor at the sampling instants, the position of the probe 10 along a conveyor unit can be traced by integrating that speed over time.

It should be noted that the line parameters include one or more of the following parameters: absolute or relative position of machine parts, pressures of machine parts, speed of machine parts, accelerations of machine parts, forces exchanged between machine parts, temperatures of machine parts, operating state of machine parts, logical state of actuators, etc.

It should be noted, more generally speaking, that the line parameters are used to identify the state or configuration of a machine at a given instant.

Also defined according to this description is a production line 1 for making smokers' articles and comprising:
- at least one machine (2, 3, 4, 5, 6, of the type described above) for processing a smokers' article;
- at least one line sensor 15 configured to measure at least one machine parameter representing the operation of at least one element of the line 1 (or of one or more machines);
- a control unit 14 connected to the at least one line sensor 15 and configured to control the operation of at least one part of the line 1;
- a probe 10 having the shape of a smokers' article and provided with at least one electronic card 11 having a local sensor 17, a memory 12, a data transmission module 13 and an electrical power supply 20, where the probe 10 is configured to acquire at least one probe 10 parameter (that is, a parameter measured by the local sensor 17);
- an electronic database 21 operatively in communication with the control unit 14 and with the memory of the probe 10 to receive and store data acquired for the at least one machine parameter and the at least one probe 10 parameter;
- a computer 18 configured to generate an activation signal and to transmit it to the probe and to the control unit 14 at a starting instant, and programmed to temporally correlate the data stored in the electronic database 21.

It should be noted that according to another aspect, the line 1 comprises the aforementioned electronic appliance 19, which has already been described.

According to another aspect, the control unit 14 of the line 1 comprises a clock and is programmed to associate with each data item it acquires a reference instant referred to the starting instant. Preferably, the probe 10 comprises a synchronizer configured to generate a synchronization signal referred to the starting instant and the processor 16 of the probe 10 is programmed to associate a value of the synchronization parameter with each data item acquired by the probe 10.

In other words, it should be noted that the clock of the control unit 14 and the synchronizer are used to assign a time instant to each probe and machine data sample, starting from the same starting instant.

According to one aspect, the synchronizer may comprise a counter and a clock.

In other words, the synchronizer may be configured to count the clock cycles always or only at predetermined events (such as sampling events, for example). According to this aspect, the synchronizer is configured to contain a value representing a count.

According to another aspect, the synchronizer may comprise a clock (electronic).

According to this aspect, the computer 18 is programmed to set in relation to each other the values of the synchronization parameter for the at least one probe parameter and corresponding reference instants of the at least one machine parameter.

Also defined according to this description is a diagnostic probe 10 for analysing at least part of a production line 1 in the tobacco industry.

It should be noted that the probe 10 is made in the shape of a smokers' article (that is, it has the shape of a smokers' article).

The probe 10 comprises an electronic card 11 having at least one local sensor 17 (preferably having a plurality of sensors 17).

The probe 10 also has a base element which houses the electronic card 11.

The probe 10 also comprises a memory 12, a data transmission module 13 and an electrical power supply 20 (or battery).

It should be noted that the memory 12 is preferably a solid-state memory.

As described above, the line 1 has a control unit 14 (single or distributed) and at least one line sensor 15 (adapted to measure a parameter representing the state of a machine or the state of a machine part or component).

The probe 10 also comprises a processor 16 (electronic).

The processor 16 is configured to receive an activation signal through the data transmission module 13 and is programmed to start acquiring at least one parameter measured by the local sensor 17.

By way of a non-limiting example, it should be noted that the at least one sensor 17 may be a sensor of one of the following types:
- A) a gyroscope (17A);
- B) an accelerometer (17B);
- C) a force sensor (17C);
- D) a thermometer (17D);
- E) a magnetometer (17E);
- F) an optical sensor (17H);
- G) an acoustic sensor (17H);
- I) an RFID.

If the probe 10 comprises two or more sensors 17, such sensors 17 may be combinations of sensors 17 of the types listed above.

With regard in particular to the sensor of type A (gyroscope), it should be noted that this sensor advantageously allows detecting the position of the probe 10 in three-dimensional space relative to the three Cartesian axes, in particular allowing detection of the position angle of the probe 10 on the three axes.

Advantageously, therefore, the gyroscope 17A allows detecting the position angle of the probe 10 along the product feed path within the line 1, checking for possible incorrect positions caused, for example, by faults/incorrect placements/malfunctioning of line parts.

With regard in particular to the sensor of type D (thermometer or temperature sensor), it should be noted that this sensor 17D advantageously allows monitoring the temperature at one or more points of the probe 10. This is particularly useful for checking gluing temperatures (in effect, some smokers' articles such as packets, for example, are glued using hot-melt glues which are applied in semiliquid form after being heated to working temperature).

With regard to the sensor of type B (accelerometer), on the other hand, it should be noted that this sensor 17B advantageously allows measuring speed changes (accelerations), thereby identifying the impacts which the probe undergoes as it moves along the feed path of the line 1.

Advantageously, therefore, this allows diagnosing possible malfunctioning of mechanical parts causing the product to be subjected to excessively strong impacts and which, if not promptly identified, may reduce the quality of the finished product.

With regard to the sensor of type C (force sensor), on the other hand, it should be noted that this sensor 17C allows diagnosing the operation of parts (such as pressing elements, for example) which strike and act directly on the faces of the product.

Preferably, the probe 10 has the shape of a packet having a plurality of faces and a plurality of edges and the probe 10 comprises a plurality of force sensors 17C located on one or more of the faces and/or on one or more of the edges.

It should be noted that it is thus possible to inspect one or more faces of the packet in such a way as to make a particularly accurate diagnosis of machine operation.

With regard to the presence of an RFID sensor on the probe 10, it should be noted that such a sensor might advantageously be used to identify the presence of the probe 10 at one or more points along the line 1.

According to this aspect, the line 1 is thus equipped with at least one RFID module.

Preferably, according to this aspect, the activation signal is emitted by the control unit 14 according to the logic described above.

It should be noted that, advantageously, the probe 10 (in particular, the base element) may be made in the shape of or have the shape of any of the following items:
- a cigarette filter (in particular if used on "filter tip attachment machines")
- a cigarette (in particular if used on "filter tip attachment machines;
- a group of cigarettes (in particular if used on "packing machines;
- a packet of cigarettes (in particular if used on "packing machines" or "overwrappers");
- a carton of cigarette packets (in particular if used on "cartoning machines");
- a spacing element (for spacing layers of cigarettes).

With regard to the fact that the probe 10 can be made in the shape of a spacing element for spacing layers of cigarettes, it should be noted that the probe 10 can preferably be made in the shape of the element denoted by the reference numeral 6 in patent application WO2014/170829A1 (and in corresponding Italian patent application BO2013A000166) whose content is incorporated herein by reference as regards the technical, functional and shape features of the element 6 and the modes of introducing the element 6 itself into the machine/line (which also apply to the probe 10).

In an example embodiment, the processor 16 is configured to receive an activation signal, through the data transmission module 13, and is programmed to start acquiring at least one parameter of the probe 10 through the at least one local sensor 17 in response to the activation signal received.

In other words, when the processor 16 of the probe 10 receives an activation signal, it issues a command to start acquiring the parameter measured by the sensor (or sensors) 17.

Thus, the (wireless) activation signal activates and starts the sampling of the signal from the sensor (or sensors) 17 on the probe 10.

The probe 10 preferably also comprises a Bluetooth interface module (or alternatively an interface module of a different type).

Furthermore, the probe 10 preferably comprises a serial port.

Preferably, according to another aspect, the probe 10 comprises a synchronizer configured to generate a synchronization signal referred to the activation instant, and the processor 16 is programmed to associate with each data item acquired a corresponding value of the synchronization signal.

Advantageously, according to this aspect, the fact that a value of the synchronization signal (referred to that activation instant) is associated with each probe data item acquired means that the subsequent analysis (performed, for example, by the computer 18) allows determining, for each data item, a value representing the acquisition reference instant (referred to the starting instant).

According to another aspect, the control unit 14 comprises an electronic device defining an electronic digital clock.

According to this aspect, the control unit 14 is programmed to associate with each (line) data item acquired a corresponding reference instant, referred to (that is, starting from) the activation instant.

A brief operative description of the method described herein is provided below.

It should be noted, as will become clearer as this description continues, that in use, the probe 10 is placed on the product feed path in the machine/part of line 1 to be diagnosed.

After introducing the probe 10 automatically or manually, the operator, through a computer 18, sends an activation signal to the probe 10, thereby triggering acquisition by the sensors 17 on board the probe 10.

At this point, the probe 10 is moved by the parts of the line 1 itself along the path normally followed by the product (filter/cigarette/packet); as it moves, the probe 10 acquires the values measured by the sensor or sensors 17 and stores them in its internal memory or transmits them to the outside (through the communication interface).

It should be noted that the activation signal is also sent to the control unit 14 of the line (or of the machine) which, in response to the activation signal received, starts acquisition of at least one parameter representing the line 1 (starting from the instant the signal is received).

It should be noted, therefore, that this way, two distinct data sets are substantially acquired (and stored) following receipt of the activation signal by the probe 10 and the control unit 14 of the line 1, respectively:
- a first data set ("probe data") corresponding to the values of the parameters measured by the sensors 17 on board the probe 10 at successive time instants (which may correspond to different positions of the probe 10 along the machine path);
- a second data set ("line data") corresponding to the values of the parameters measured by the sensors 15 of the line 1 at successive time instants.

It should be noted that the first data set is temporally connected to the second data set because both have the same time origin (that is, the first sample is acquired, for both of the data sets, at the same time instant, corresponding to the instant the activation signal is received).

Also, the samples of both the first and second data sets are associated with time instants, though in different ways (through the synchronizer for the probe 10 and through the clock for the control unit 14). Hence, as may be inferred, the first and second data sets can thus be temporally compared with each other (because they are both referred to the same time instant, which is the activation time instant).

It should be noted, therefore, that temporally correlating the "probe data" set with the "line data" set advantageously allows performing particularly precise and accurate diagnoses.

Indeed, the instantaneous position of the probe 10 within the line 1 can be identified by directly comparing the line data with the probe data in order to detect and solve any faults.

Also, as is known, the machines of the line 1 may have parts of a cyclic kind (for example, rotating wheels) which may have a fault at one phase angle of the part (and not at others): thanks to the method according to this description, the availability of the line data (which may include position, part phase, etc.) also allows faults of this kind to be quickly identified.

Another example is the case where an impact of anomalous intensity is detected: knowing the position of the probe 10 along the line 1 at the moment of impact allows narrowing the problem to a particular portion of the line 1 so that the cause of the problem can be promptly detected and solved.

It should be noted that the probe data and the line data are preferably transferred into the electronic database 21 (or archive).

Preferably, the electronic database 21 forms part of the electronic appliance 19 outside the control unit and probe 10.

Transfer may be in real time, that is to say, the data item acquired is transferred to the electronic database 21 substantially the same moment it is acquired (transmitted by the probe 10 or by the line control unit) or it may be an off-line transfer, that is to say, the data item acquired is transferred to the electronic database 21 at a time after it is acquired, for example at the end of the acquisition cycle, (the latter solution being preferable).

According to another aspect, also defined is a method for analysing the operation of at least part of a production line 1 in the tobacco industry by means of a probe 10 having the shape of a smokers' article and provided with at least one local sensor 17, a memory 12, a data transmission module 13 and an electrical power supply 20.

This method comprises the following steps:
introducing the probe 10 into the line 1 at an infeed position;
activating the probe 10 by means of a (wireless) activation signal and causing the probe 10 to start transiting the aforementioned at least one part of the line 1;
acquiring a probe data set from the probe 10 in transit by means of the at least one local sensor 17, and where acquisition is started by the processor of the probe 10 in response to the activation signal received.

It should be noted that preferably, but not necessarily, the probe 10 is introduced at the infeed end of the line 1, or at the infeed end of one of the machines making up the line 1.

According to another aspect, the probe 10 is preferably introduced when the line 1 is already in operation, that is, driven at normal operating speed.

Preferably, according to this aspect, the probe 10 is introduced into the line 1 at the product feed section together with other products of the same type/shape (filters, cigarettes, packets, cartons, groups of cigarettes, spacing elements).

Advantageously, according to this aspect, the probe 10 is introduced into the line together with the other products of the same type/shape: that way, the data measured by the sensor/sensors 17 definitely represent the normal operating conditions of the line.

According to another aspect, the method for analysing the operation of at least part of a production line 1 in the tobacco industry comprises a step of associating with each data item acquired by the probe 10 a corresponding value of the synchronization parameter referred to the activation instant and generated by a synchronizer included in the probe 10.

According to another aspect, the method comprises the following steps:
transferring the probe data set to an electronic database 21;
temporally correlating the probe data set with a line data set acquired during transit of the probe 10 in the line 1 by at least one line sensor 15 connected to a control unit 14 of the line 1.

According to yet another aspect, the control unit 14 of the line 1 receives the activation signal and assigns to the data of that line data set, corresponding reference instants referred to the activation instant.

An advantage associated with this description is that it makes available a diagnostic method for analysing the operation of a part of the line 1 and which allows detecting faults and malfunctions of the line 1 very quickly and easily and with extreme precision and accuracy.

It should also be noted that this diagnostic method can also be used during final installation and assembly of the line 1: in effect, at this stage, operators can use the method described herein to test the actual performance of the line 1 before it is delivered to the end customer.

Also defined according to another aspect of this description is a diagnostic method for analysing the operation of an automatic machine which processes products in the tobacco industry, (labelled 2, 3, 4, 5 and 6 in FIG. 1), comprising the following steps:
introducing into the machine 2, 3, 4, 5, 6 a probe 10 whose shape and size correspond to the shape and size of the products the machine 2, 3, 4, 5, 6 is designed to process, wherein the probe 10 comprises at least one sensor 17 capable of measuring the value of at least one parameter representing the situations the probe 10 is subjected to over time (corresponding to the situations a real product is subjected to);
processing the probe 10 in the machine 2, 3, 4, 5, 6 as if it were a real product;
determining the positions adopted by the probe 10 while it is being processed in the machine;
associating the values measured by the sensor 17 during the processing of the probe 10 in the machine 2, 3, 4, 5, 6 with corresponding positions adopted by the probe 10 during its processing in the machine 2, 3, 4, 5, 6.

It should be noted that the above described method advantageously allows very precise diagnosis to be performed on the machine because knowing the position of the probe 10 means that malfunctions and/or faults can be located very precisely.

It should also be noted that the probe 10 is processed like an ordinary product; that is to say, it is introduced into the machine/line and follows the same path as the products of the same type being processed.

In this sense, the probe 10 is subjected to the same physical phenomena (impact, compression, acceleration, heating) and undergoes the same processes as a product of the same type.

According to another aspect of this description. the control unit 14 may be configured to adjust one or more operational settings of the machine/line 1 as a function of the values measured by the sensor 17.

In other words, during or after the passage of the probe 10 along the normal product processing path in the machine/line, the control unit 14 may adjust one or more operating parameters of the parts/components making up the machine/line as a function of the values measured by the sensor 17.

For example, if the temperature measured by the sensor 17 of the probe 10 at a certain point is too high, the control unit 14 can adjust the thermal power of one or more heating devices operating at the position corresponding to the fault detected.

This advantageously allows implementing an auto-adaptive (feedback) operating mode based on values measured by the sensor 17 of the probe 10 while it is being processed in the machine/line 1.

Adjustment based on the values of the at least one sensor 17 of the probe 10 may be on-line or off-line, that is to say, performed during or after processing of the probe 10 in the machine/line.

This allows implementing feedback on the operating parameters of the machine/line based on the values measured by the sensor (or sensors) 17 of the probe 10 while it is being processed in the machine/line 1.

That means any faults detected can be promptly corrected and the machine/line quickly returned to full operating efficiency.

The invention claimed is:

1. A diagnostic method for analyzing operation of at least part of a production line in a tobacco industry through a probe shaped as a smoker's article and including at least one local sensor, a processor, a memory, a data transmission module and an electrical power supply, wherein the production line has a control unit and at least one line sensor, the control unit including a processor, the method comprising the following steps:
    generating an activation signal;
    transmitting the activation signal to the processor of the probe at a starting instant;
    transmitting the activation signal to the processor of the control unit at the starting instant, wherein the step of transmitting the activation signal to the processor of the probe and the step of transmitting the activation signal to the processor of the control unit are carried out in synchronous fashion.

2. The method according to claim 1, wherein the transmitting of the activation signal to the processor of the probe is synchronous to the transmitting of the activation signal to the processor of the control unit.

3. The method according to claim 1, wherein the set of probe data is acquired from the probe, as the probe moves through the at least part of the production line.

4. The method according to claim 1, wherein the temporally correlating comprises, for each item of the probe data set, setting in relation to each other a synchronization parameter value, referred to the starting instant and assigned to that data item, and a corresponding reference instant assigned to at least one respective item of the line data set.

5. The method according to claim 1, further comprising a step of transmitting a stop signal to the processor of the probe and to the control unit at the end of acquisition instant.

6. The method according to claim 1, wherein the probe is shaped like one of the following smokers' articles:
    cigarette filter;
    cigarette;
    cigarette spacing element;
    cigarette packet;
    carton of cigarette packets.

7. The method according to claim 1, comprising the following steps:
    processing the correlated data sets of the probe and of the production line to generate an adjustment signal;
    automatically varying a setting of one or more components of the production line as a function of the adjustment signal.

8. The method according to claim 1, wherein the probe data includes one or more items of the following list:
    a position of the probe;
    speed variation of the probe;
    pressure or strain applied to the probe;
    temperature of the probe;
    magnetic field intensity in an atmosphere surrounding the probe;
    intensity of irradiation received by the probe;
    intensity of noise in the atmosphere surrounding the probe.

9. The method according to claim 1, wherein the probe acquires at least a probe parameter through at least a local sensor.

10. The method according to claim 9, wherein the probe parameter is representative of a pressure or strain applied to the probe, as the probe moves through the at least part of the production line.

11. A production line in a tobacco industry, comprising:
    at least one machine for continuously processing a succession of smoker's articles;
    at least one line sensor configured to measure at least one machine parameter representing operation of at least one element of the production line;
    a controller connected to the at least one line sensor and configured to control the operation of the at least one element of the production line;
    a probe shaped as a smoker's article and including at least one electronic card having at least a local sensor, a memory, a data transmission module and an electrical power supply, wherein the probe is configured to acquire at least one probe parameter;
    an electronic database operatively in communication with the controller and with the memory of the probe to receive and store data acquired for the at least one machine parameter and the at least one probe parameter;
    a computer configured to generate an activation signal and to transmit the activation signal to the probe and to the controller at a starting instant, and programmed to temporally correlate the data stored in the electronic database, wherein the computer is programmed to transmit the activation signal to the probe and to the controller in a synchronous manner.

12. The production line according to claim 11, wherein the probe is configured for travelling through at least part of the production line, and wherein the probe is configured to acquire the at least one probe parameter as the probe moves through the at least part of the production line.

13. The production line according to claim 11, wherein:
    the controller of the production line comprises a clock and is programmed to associate with each data item the controller acquires, the starting instant;
    the probe comprises a synchronizer configured to generate a synchronization parameter representing the starting instant and the processor of the probe is programmed to associate a value of the synchronization parameter with each data item acquired by the probe;
    the computer is programmed to set in relation to each other values of the synchronization parameter for the at least one probe parameter and corresponding reference instants of the at least one machine parameter.

14. The production line according to claim 11, wherein the at least one machine parameter includes a phase parameter representing a position occupied at a given instant by a conveyor unit configured to move the smokers' articles along the at least part of the production line.

15. The production line according to claim 11, wherein the controller of the production line and the processor of the probe are configured to acquire the respective data at a same sampling frequency.

16. The production line according to claim 11, comprising a portable electronic appliance which includes the electronic database and the computer.

17. The production line according to claim 11, comprising a detector located along a movement path for the smokers' articles and configured to interact with a recognition element included in the probe, to detect a presence of the probe on the movement path, wherein the computer is programmed to automatically generate the start signal in response to detection of the probe by the detector, wherein the recognition element includes at least one chosen from the group of an RFID device, a magnet and an optical identifier.

18. The production line according to claim 11, wherein the computer is configured to process the data acquired and correlated, to generate and adjustment signal, and wherein the controller is configured to vary a setting of one or more line components automatically as a function of the adjustment signal.

19. The production line according to claim 11, wherein the at least the local sensor of the probe is selected from the following list: a gyroscope; an accelerometer; a force sensor; a thermometer; a magnetometer; an optical sensor; an acoustic sensor; and a capacity sensor.

20. The production line according to claim 11, wherein the probe parameter is representative of a pressure or strain applied to the probe, as the probe moves through the at least part of the production line.

21. A diagnostic method for anal analyzing operation of at least part of a production line in a tobacco industry through a probe shaped as a smokers' article and including at least one local sensor, a processor, a memory, a data transmission module and an electrical power supply, the method comprising the following steps:
   introducing the probe into the production line at an infeed position;
   activating the probe through a wireless activation signal and causing the probe to start transiting the at least part of the production line at a starting instant;
   acquiring at least one machine parameter representing operation of at east one element of the production line;
   acquiring a probe data set from the probe in transit through the at least one local sensor, wherein acquisition is started by the processor of the probe in response to the activation signal received;
   wherein the probe generates a synchronization parameter representing the starting instant and associates a value of the synchronization parameter with each data item acquired by the probe;
   setting in relation to each other values of the synchronization parameter for the at least one probe parameter and corresponding reference instants of the at least one machine parameter.

22. The method according to claim 21, comprising a step of associating with each data item acquired by the probe a corresponding value of the synchronization parameter representing the activation instant and generated by a synchronizer included in the probe.

23. The method according to claim 21, comprising the following steps:
   transferring the probe data set to an electronic database;
   temporally correlating the probe data set with a line data set acquired during transit of the probe in the production line by at least one line sensor connected to a control unit of the production line.

24. The method according to claim 21, wherein the control unit of the production line receives the activation signal and assigns to the data of that line data set, corresponding reference instants representing the activation instant.

25. The method according to claim 21, comprising a step of processing the probe data set, to identify anomalies in the at least part of the production line.

26. A production line in a tobacco industry, comprising:
   at least one machine for continuously processing a succession of smokers' articles;
   at least one line sensor configured to measure at least one machine parameter representing operation of at least one element of the production line;
   a controller connected to the at least one line sensor and configured to control the operation of the at least one element of the production line;
   a probe shaped as a smokers' article and including at least one electronic card having at least a local sensor, a memory, a data transmission module and an electrical power supply, wherein the probe is configured to acquire at least one probe parameter;
   an electronic database operatively in communication with the controller and with the memory of the probe to receive and store data acquired for the at least one machine parameter and the at least one probe parameter;
   a computer configured to generate an activation signal and to transmit the activation signal to the probe and to the controller at a starting instant, and programmed to temporally correlate the data stored in the electronic database;
   the controller of the production line comprising a clock and being programmed to associate with each data item the control unit acquires, the starting instant;
   the probe comprising a synchronizer configured to generate a synchronization parameter representing the starting instant and the processor of the probe being programmed to associate a value of the synchronization parameter with each data item acquired by the probe;
   the computer being programmed to set in relation to each other values of the synchronization parameter for the at least one probe parameter and corresponding reference instants of the at least one machine parameter.

27. A production line in a tobacco industry, comprising:
   at least one machine for continuously processing a succession of smokers' articles;
   at least one line sensor configured to measure at least one machine parameter representing operation of at least one element of the production line;
   a controller connected to the at least one line sensor and configured to control the operation of the at least one element of the production line;
   a probe shaped as a smokers' article and including at least one electronic card having at least a local sensor, a memory, a data transmission module and an electrical power supply, wherein the probe is configured to acquire at least one probe parameter;
   an electronic database operatively in communication with the controller and with the memory of the probe to receive and store data acquired for the at least one machine parameter and the at least one probe parameter;

a computer configured to generate an activation signal and to transmit the activation signal to the probe and to the controller at a starting instant, and programmed to temporally correlate the data stored in the electronic database;

the controller of the production line and the processor of the probe being configured to acquire the respective data at a same sampling frequency.

\* \* \* \* \*